July 3, 1956
R. M. ASHBY
2,753,528
ULTRASONIC DELAY LINES
Filed Sept. 21, 1948
2 Sheets-Sheet 1
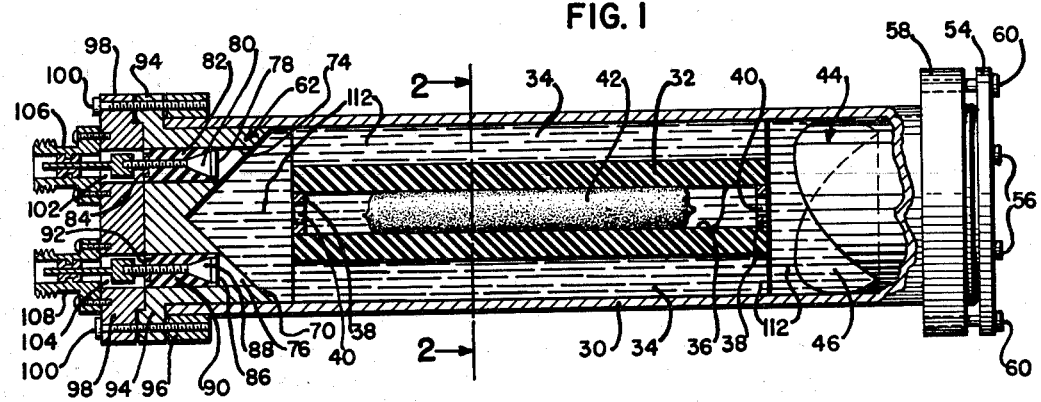
FIG. 1
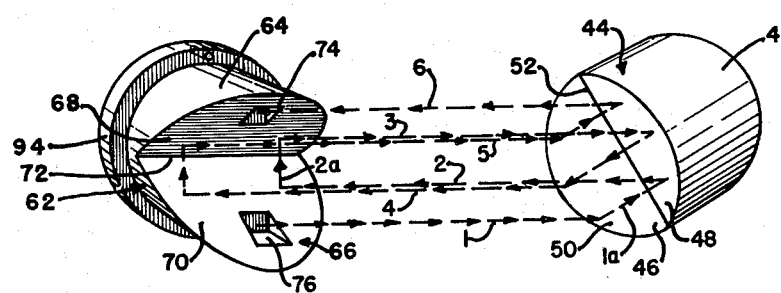
FIG. 3
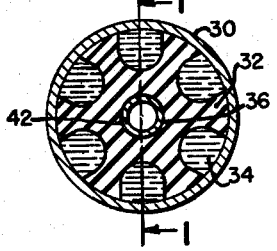
FIG. 2
FIG. 4
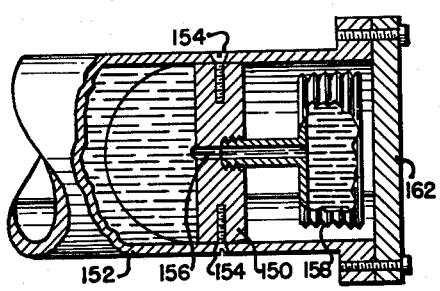
FIG. 5
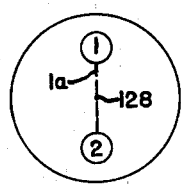
FIG. 6
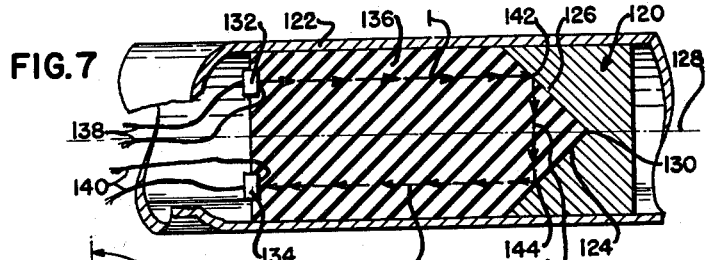
FIG. 7
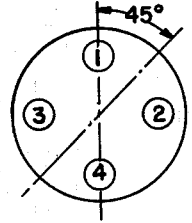
FIG. 8  FIG. 9
INVENTOR
ROBERT M. ASHBY
BY *M. A. Hayes*
ATTORNEY July 3, 1956

R. M. ASHBY 2,753,528

ULTRASONIC DELAY LINES

Filed Sept. 21, 1948

INVENTOR
ROBERT M. ASHBY

BY *M. C. Hayes*

ATTORNEY

United States Patent Office 2,753,528
Patented July 3, 1956

2,753,528
ULTRASONIC DELAY LINES
Robert M. Ashby, Cambridge, Mass.

Application September 21, 1948, Serial No. 50,341

29 Claims. (Cl. 333—30)

(Granted under Title 35, U. S. Code (1952), sec. 266)

This invention relates, in general, to the art of delaying, in time, electrical signal transmission and, more particularly, to ultrasonic delay lines employing multiple reflections of a directive acoustical beam.

In the electronic art, it is frequently desirable to delay signal transmission for periods of time ranging up to several milliseconds in duration. It is usually not feasible to employ electromagnetic delay lines for delays of these magnitudes. To attain a longer delay time than is possible with electromagnetic delay lines, various types of ultrasonic delay lines have come into general use. These ultrasonic delay lines operate as follows: The signals to be delayed a small, finite time are caused to modulate a high frequency signal. The frequency of the latter signal may be of the order of several megacycles per second. This modulated high frequency signal is converted to an acoustical (sound) signal which is made to traverse a given path as ultrasonic energy. At the end of this path, some or all of the acoustical energy is reconverted to electrical energy, amplified and detected to yield the original signal. The relatively low velocity of propagation of sound within the delay line results in longer delay times in this type than is possible with electromagnetic delay lines. The delay time in such an ultrasonic delay line is proportional to the total path length from the input to the output of the device. Even with the relatively low velocity of the propagation of sound, it frequently happens that the path lengths required is so great that it is difficult or impractical to construct a delay line having a single straight path from the input to the output. To reduce the over-all length of ultrasonic delay lines, for the longer delay times, tubes containing a liquid propagation medium have been arranged in various patterns with reflectors placed at the junctions of the tubes to direct the energy from one tube to another. Delay lines of this type have a relatively large size, are relatively difficult to construct, and are subject to leakage of the propagation medium. A second type of delay line using multiple reflection paths consists of a tank containing a liquid propagation medium with reflectors placed at certain points in the tank and in the path of the ultrasonic beam. These reflectors cause the ultrasonic beam to traverse the length and width of the tank a number of times before arriving at the output of the delay line. Delay lines of this type are also difficult to construct, are frequently unstable in their operation, and are apt to produce unwanted signals due to the fact that multiple reflections in the medium present alternative paths for the reflected beam.

Therefore, it is an object of the present invention to provide a delay line employing multiple reflecting paths which is of particularly compact, simple, and rugged mechanical construction.

A further object of the invention is to provide a delay line which is light in weight and which possesses great mechanical stability under adverse conditions of operation as regards shock and vibration.

An additional object is to provide a delay line which may be contained within a single cylinder of relative small size.

Another object of the invention is to provide a liquid delay line that will operate satisfactorily in any position.

In general, the present invention consists of a cylindrical propagation medium with a corner reflector disposed at each end of this propagation medium. Means are provided at one or both of the corner reflectors for the generation and reception of acoustical energy. The major paths of the energy in this delay line are parallel to a common axis. For a better understanding of the invention, together with other and further objects, features, and advantages, reference should be made to the following description which is to be read in connection with the accompanying drawings wherein:

Fig. 1 is an elevation view, partly in section, of a preferred embodiment of the invention, the section of Fig. 1 being taken along the line 1—1 of Fig. 2;

Fig. 2 is a cross-section of the embodiment of the figure shown in Fig. 1 taken along the line 2—2 of Fig. 1;

Fig. 3 is an isometric drawing of the corner reflectors of the embodiment shown in Fig. 1;

Fig. 4 is a diagram showing the position of the major paths of the embodiment of Fig. 1;

Fig. 5 is an elevation view partially in section, showing a modification of the embodiment shown in Fig. 1;

Fig. 6 is a diagram of the major paths of a delay line having two major paths;

Fig. 7 is a cross-section of a delay line employing two major paths;

Fig. 8 is a diagram showing the disposition of paths in a delay line having four major paths;

Fig. 9 is a diagram of a second disposition of paths in a delay line having four major paths;

Figure 10:
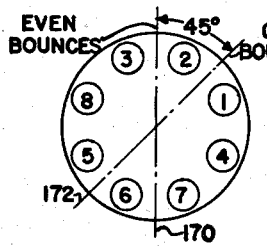
Fig. 10 is a diagram showing the disposition of paths in a delay line having eight major paths.

The embodiment of the invention shown in Figs. 1 to 3 includes a cylinder 30 which may be constructed of any mechanically rigid material, for example, stainless steel. Disposed within cylinder 30, and intermediate the ends thereof, is a path defining member 32. Member 32 is a cylinder of any suitable rigid material that is inert to the transmission medium employed, and which has an outer diameter that is substantially equal to the inner diameter of tube 30. A plurality of U-shaped grooves 34 are formed in the circumference of member 32. Member 32 may be formed by machining grooves 34 in a cylinder of suitable material, for example, Bakelite; or member 32 may be cast in the desired shape by any well-known means. If member 32 is cast in the shape shown, it may be desirable to cast it directly within tube 30. Member 32 is also formed with an axial opening 36 extending the length of member 32.

The ends of opening 36 are partially closed by discs 38 having central openings 40 formed therein. Before discs 38 are fastened in position, a resilient container 42 filled with a gas under pressure is placed within the axial opening 36. Container 42 is preferably formed of an inert plastic, for example, Koroseal.

An alternate method of constructing member 32 consists of locating sections of glass or similar tubing at positions corresponding to openings 34 and 36 and securing these tube sections in position in any well-known manner.

A corner reflector 44 is disposed within one end of tube 30. Reflector 44 is formed of a metal cylinder 45 having a V-shaped groove 46 formed in one end thereof. Groove 46 is defined by two faces 48 and 50, each making an angle of 90° with each other and an angle of 45° with the longitudinal axis of cylinder 45. The line of intersection 52 of faces 48 and 50 lies along a diameter of cylinder 45. Reflector 44 may be formed integrally with an end plate 54 or may be fastened to end plate 54 by fastening means 56. Fastening means 56 may be screws passing through openings in plate 54 and engaging threaded openings (not shown) in cylinder 44.

An upstanding annular flange 58 is formed integrally with, or is rigidly affixed to, one end of tube 30. Plate 54 is secured to flange 58 through fastening means 60. Suitable gaskets (not shown) may be employed between the plate 54 and flange 58 to provide a liquid tight closure of the end of tube 50.

A second reflector 62 is disposed in the end of tube 30 opposite reflector 44. Reflector 62 is similar in construction to that of reflector 44 and comprises a cylinder 64 having a V-shaped notch 66 formed in one end thereof. Notch 66 is defined by two faces 68 and 70 which intersect each other at an angle of 90° and which form an angle of 45° with the axis of cylinder 64. The line of intersection 72 of faces 68 and 70 lies along a diameter of cylinder 64. A recess 74 is formed in face 68 and recess 76 is formed in face 70. Recesses 74 and 76 are most clearly shown in Fig. 1. Recess 74 houses the receiving electro-acoustical transducer which includes a crystal 78 positioned with the face adjacent reflector 62 perpendicular to the axis of tube 30. Crystal 78 is in mechanical and electrical contact with a backing member 80. Member 80 is insulated from cylinder 64 by suitable dielectric material 82. Member 80 is preferably composed of a conductive material and is retained within recess 74 by means of fastening device 84.

A second crystal 86, a backing member 88, dielectric medium 90, and fastening device 92 form the transmitting electro-acoustical transducer which is located within recess 76. The transmitting and receiving transducers may be of identical construction.

Openings 74 and 76 have been illustrated in Fig. 3 as having a rectangular cross section. However, it is to be understood that the cross section may be rectangular, circular, or any other regular shape or of any irregular shape found to be convenient in constructing the delay line.

In certain embodiments of the invention which have not been illustrated herein, a ridge is formed extending from opening 74 to 76 perpendicular to line of intersection 72. This ridge divides notch 66 into two smaller notches, one on either side of the ridge but it in no way alters the operation of the delay line. Therefore, for clarity in the description and claims, the term "corner reflector," as it applies to reflector 62, includes all constructions wherein the active portions of reflector 62 lie in or parallel to faces 68 and 70 whether or not the two or more active portions are divided by a ridge or other structure not intended to intercept the acoustical beam.

Cylinder 64 is formed with an upstanding flange 94 at one end thereof to provide means for securing cylinder 64 in position. An upstanding annular flange 96 is formed integrally with or is rigidly fastened to the left-hand end of tube 30 as shown in Fig. 1. Flange 94 is clamped between the end of tube 30 and a cover plate 98. Cover plate 98 is held in position by fastening means 100 which passes through openings in plate 98 and flange 94 and engage threaded openings in flange 96. Suitable gasket material (not shown) may be disposed intermediate flange 90 and tube 30 to provide a liquid type closure of the left-hand end of tube 30. Plate 98 is formed with openings 102 and 104 into which extend the ends of members 80 and 88. Coaxial connectors 106 and 108 are secured to plate 98 and are located over openings 102 and 104, respectively. The outer shell of connector 106 and 108 makes electrical contact with plate 98. The inner conductors of connectors 106 and 108 are insulated from plate 98 but make electrical contact with members 80 and 88 respectively.

The interior of tube 30, not otherwise occupied by reflectors 44 and 62 and members 32 and 42, is filled with ultrasonic transmission medium. For purposes of illustration it may be assumed that this medium is mercury.

Before discussing the operation of the delay line shown in Figs. 1–3 the delay line shown in Fig. 7 will first be described. The delay line shown in Fig. 7 differs from the delay line shown in Figs. 1 to 3 in that it employs but a single reflector 120 disposed within the hollow cylindrical tube 122. Reflector 120 is formed with a V-shaped groove at one end thereof, this groove being defined by faces 124 and 126. Faces 124 and 126 make an angle of 90° with each other and an angle of 45° at an axis 128 of tube 122. The line of intersection of faces 124 and 126 lies along the diameter of reflector 120 and is perpendicular to the axis 128. A transmitting crystal 132 and a receiving crystal 134 are supported at the left-hand end of tube 122 by a solid acoustical energy transmission medium 136. For optimum operation, the acoustical impedances of medium 136 and reflector 120 should differ by an amount that will result in substantially all of the energy impinging on faces 124 and 126 at an angle of 45° to the normal being reflected back into medium 136. Conductors 138 provide means for making electrical connection to the two faces of crystal 132, and conductors 140 provide means for making connection to the two faces of crystal 134. Crystals 132 and 134 are disposed on a diameter of tube 122 which is perpendicular to the line of intersection 130 of faces 126 and 124. The position of crystals 132 and 134 is represented by numbered circles 1 and 2, respectively, in Fig. 6.

It is to be understood that the transmission medium may be liquid provided suitable provisions are made to support crystals 132 and 134 and to retain the liquid medium within tube 122.

The operation of the relay line shown in Fig. 7 is as follows:

A signal having a frequency of several megacycles, which is modulated by the signal to be delayed, is applied through conductors 138 to crystal 132. This signal causes crystal 132 to oscillate and send a pulse of ultrasonic energy through transmission medium 136 along path No. 1 as shown in Fig. 7. If the faces of crystal 132 are perpendicular to the axis 128, path 1 will be parallel to axis 128. The energy travelling along path 1 strikes face 126 at point 142. The energy in path 1 will rebound from face 126 such that the angle of incidence is equal to the angle of reflection. In Fig. 7, the path of energy reflected from face 126 is denoted by path 1a. Energy travelling along path 1a strikes face 124 at point 144. The energy striking point 144 is again reflected with the angle of incidence equal to the angle of reflection and travels along the path denoted as path No. 2 in Fig. 7. Energy travelling along path No. 2 strikes crystal 134 and stresses this crystal. The stress in crystal 134 causes an electrical signal to appear between conductors 140. This electrical signal may be detected and amplified in any well-known manner to provide a signal that is similar to the input signal but delayed in time by the time required for the acoustical energy to travel the combined lengths of paths 1, 1a and 2. From the geometry of Fig. 7 it will be apparent that path No. 2 is parallel to path No.

1 and is the same distance from axis 128 as is path No. 1. The location of major paths 1 and 2 within tube 122 is illustrated by circles No. 1 and 2 in Fig. 6. Obviously, paths 1 and 2 may lie at any distance from axes 128, but, as stated above, path 2 will always lie the same distance from axis 128 as does path No. 1. Referring once again to Figs. 1 to 3 the operation of the embodiment there shown will now be described.

An input signal similar to the signal applied to conductors 138 of Fig. 7 is applied to coaxial connector 108 of Fig. 1. The inner conductor of connector 108 makes electrical contact with the left-hand face of crystal 86. The outer shell of connector 108 makes electrical contact with the right-hand face of crystal 86 through a plate 98, cylinder 62 and the mercury transmission medium 112. Crystal 86 is located at the position denoted by circle No. 1 in Fig. 4. The line of intersection 72 of faces 68 and 70 of Fig. 3 is represented in Fig. 4 as line 72'. The line of intersection 52 of faces 48 and 50 is represented in Fig. 4 by line 52'. It will be noted that lines 52' and 72' make an angle of 60° with each other. When the signal is applied to crystal 86 this crystal causes a pulse of acoustical energy to be transmitted along the paths marked No. 1 in Fig. 3. The position of path No. 1 within tube 30 and with respect to lines of intersection 52 and 72 is represented by the circle No. 1 of Fig. 4. Energy travelling along path 1 strikes face 50 of reflector 44 and rebounds along path 1a of Fig. 3. The energy in path 1a strikes face 48 and then rebounds along path No. 2. The position of path No. 2 within tube 30 is represented by circle No. 2 in Fig. 4. It will be noted that paths 1 and 2 lie at equal distances on either side of the line of intersection 52 and along a line perpendicular to this line of intersection. Energy travelling along path 2 strikes face 70 and rebounds along path 2a. Energy travelling in path 2a strikes face 68 and rebounds along the path No. 3. Path No. 3 is parallel to paths 1 and 2 and parallel to the axis of tube 30. As shown in Fig. 4 paths 2 and 3 lie at equal distances on either side of the line of intersection 72 and along a line perpendicular to line 72. In a similar manner, energy travelling along path 3 strikes faces 48 and 50 in that order and rebounds along path 4. Energy travelling in path No. 4 strikes faces 70 and 68 in that order and rebounds along path 5. Energy travelling in path 5 strikes faces 50 and 48 in that order and rebounds along path 6. The relative position of paths 1 to 6 within tube 30 is shown by numbered circles 1 to 6 respectively in Fig. 4. Paths 1 to 6 are each parallel to the axis of tube 30. Energy travelling along path 6 strikes crystal 78 stressing this crystal. The stress in crystal 78 causes electrical charges to appear at the face of this crystal and the changes in these charges appear as an electrical signal between the outer shell and the inner conductor of connector 106. Again, the outer shell of connector 108 is connected to the right-hand face of crystal 78 through plate 98, cylinder 64 and the mercury transmission medium 112.

A comparison of Figs. 2 and 4 will also show that paths 1 through 6 correspond to the position of grooves 34 in member 32. Member 32 has a plurality of functions. First, it separates the various paths of the acoustical energy and thus prevents interaction between signals in the various paths. Second, member 32 may be made of a material that is considerably lighter than the mercury transmission medium. This results in a considerable reduction in weight of the delay line. Third, the cylinder 42 within member 32 provides an expansion chamber for the mercury transmission medium 112. If the medium 112 expands, due to an increase in temperature of the medium, the gas within cylinder 42 will be compressed. If the volume of medium 112 decreases due to a decrease in temperature the volume of cylinder 42 will expand to prevent any voids appearing in the transmission paths.

In delay lines employing more than six reflecting paths, the structure at the center of tube 30 may become objectionable. Therefore, it will be necessary to provide an alternative means for allowing expansion of the transmission medium 112. Various means of providing such expansion will be obvious to those skilled in the art. However, one alternative type has been illustrated in Fig. 5. A corner reflector 150 is disposed a short distance from the end of tube 152 and is maintained in position by fastening means 154. A central opening 156 in reflector 150 communicates with a sylphon bellows 158 which is mechanically connected to reflector 150. The opening 156 may be made considerably smaller in diameter than the central portion of structure 32 and therefore will be unobjectionable in most instances. As the liquid medium 160 within tube 152 expands sylphon bellows 158 expands to accommodate the increase in volume. As the liquid 160 medium contracts sylphon bellows 158 also contracts due to its own resiliency to force additional liquid into the interior of tube 152 at the left of reflector 150. Preferably, sylphon bellows 158 should have sufficient resiliency to prevent any voids occurring in the liquid transmission medium at the left of reflector 150 regardless of the position of tube 152. Bellows 158 is preferably protected against mechanical injury by a plate 162 secured to the end of tube 152.

In certain instances, it may be desirable to provide means for adjusting the delay time introduced by the delay line to some predetermined value. This adjustment may be accomplished by making the position of one of the transducers adjustable within reflector 62 or alternatively the position of reflector 44 or 62 adjustable within tube 30. Means for accomplishing the above-mentioned results will be immediately apparent to those skilled in the art.

Figs. 8 and 9 indicate the position of the major paths in a delay line employing four major transmission paths. As shown in Figs. 8 and 9, there are two alternative arrangements of the path locations. If the angle between the lines of intersection of the faces of the two corner reflectors is 45° as shown in Fig. 8, the major transmission paths will be disposed within the transmission line as shown by numbered circles 1 to 4, respectively, of Fig. 8. The transmitting crystal will be located within one corner reflector at a position corresponding to the position of circle No. 1 in Fig. 8, and the receiving crystal will be located within the same corner reflector at a position corresponding to the position of circle No. 4 in Fig. 8. If the angle between the lines of intersection of the faces of the two corner reflectors is 90° as shown in Fig. 9 the position of the major reflecting paths within the delay line will be as illustrated by numbered circles 1 through 4 in Fig. 9. Again, the transmitting crystal will be located at the position denoted by circle No. 1 in Fig. 9 and the receiving crystal will be located at the position denoted by circle No. 4 of Fig. 9. Both the transmitting and receiving crystals will be located at the same end of the delay line. The reflectors for a delay line having four major transmission paths have not been illustrated but it is believed that the shape of these corner reflectors will be obvious from the reflectors previously described and the reflectors that will be described presently.

Fig. 10 is a diagram showing the location of the reflecting paths in a delay line employing eight major transmission paths. The angle between the line 170 representing the line of intersection of the faces of the corner reflector in which the transmitting and receiving crystals are mounted makes an angle of 45° with line 172 which represents the line of intersection of the faces of the corner reflector opposite the reflector in which the transmitting and receiving crystals are located. For simplicity, the line of intersection of the two planes of the corner reflector may be referred to as the vertex line of the reflector. The transmitting crystal will be located in one reflector at a position corresponding to the circle No. 1 of Fig. 10, and the receiving crystal will be located at a position corresponding to the position of circle No. 8 of Fig. 10.

Figure 11:
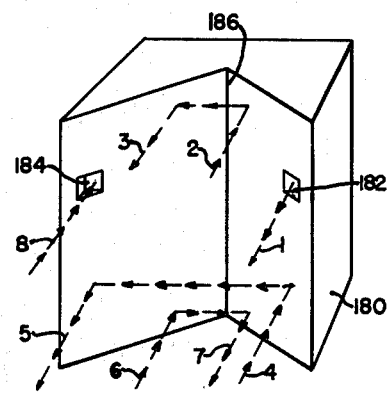
Fig. 11 is an isometric view of one of the corner reflectors employed in a delay line having eight major paths.

The major transmission paths 1 through 8 and the minor paths connecting these major paths have been illustrated by means of the dash lines numbered 1 through 8, respectively, in Fig. 11. Dash line 1 corresponds to path No. 1 of Fig. 10. Dash line 2 corresponds to path No. 2 of Fig. 10, etc.

The path of the acoustical signal from the transmitting crystal to the receiving crystal may be easily traced if the following conditions are kept in mind. The reflections from an odd numbered path to an even numbered path take place perpendicular to line 172, and the incident and reflected paths are disposed at equal distances on opposite sides of line 172, while the reflections from an even numbered path to an odd numbered path lie along a line perpendicular to line 170, and again the incident and reflected paths lie at equal distances on opposite sides of line 170.

Fig. 11 illustrates a corner reflector 180 of the type that would be used with a delay line employing eight major transmission paths. Reflector 180 is formed with recesses 182 and 184 at positions corresponding to numbered circles 1 and 8, respectively, of Fig. 10. The transmitting and receiving crystals or transducers are located within recesses 182 and 184, respectively. The corner reflector 180 has been illustrated as having a rectangular shape. If desired, the delay line may be formed in a rectangular tube rather than a circular tube, as has been illustrated in the previous figures. However, if it is desired to use the circular shape, it will be found that all of the reflecting paths shown in Fig. 11 lie within a cylinder having a diameter corresponding to the line of intersection 186.

It is usually desirable to employ an even number of major transmission paths in delay lines of the type described herein for the reason that the transmitting and receiving crystals are both located within the same corner reflector when an even number of paths are employed. One reflector in the delay line having any even number of paths from 2 to 24 will be a simple diplanar corner reflector similar to reflector 44 of Fig. 3. The angle in degrees between the lines of intersection of the two corner reflectors for delay lines having an even number of major transmission paths may be selected as 360 divided by the number of major transmission paths, although other angles may work equally as well in some instances. However, if it is found desirable to employ a delay line containing an odd number of major transmission paths, the receiving crystal may be located at the point where any odd number transmission path strikes one of the corner reflectors.

Figure 12:
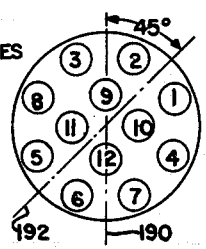
Fig. 12 is a diagram showing the disposition of paths in a delay line having twelve major paths.

Fig. 12 is a diagram showing the location of the major transmission paths in a delay line employing twelve such paths. In Fig. 12, line 190 represents the direction of the vertex line of the reflector upon which or within which the transmitting and receiving crystals are located, while line 192 represents the position of the vertex line of the opposite reflector. The angle between lines 190 and 192 is 45°. Rather than increase the number of reflections around the circumference of the delay line, the delay line employing twelve major transmission paths is preferably made up of a combination of the delay line illustrated by Fig. 10 which has eight major transmission paths and a delay line of the type illustrated by Fig. 8 which has four major transmission paths. It will be noted that both the delay lines illustrated by Figs. 8 and 10 have an angle of 45° between the reflector axes.

Figure 13:
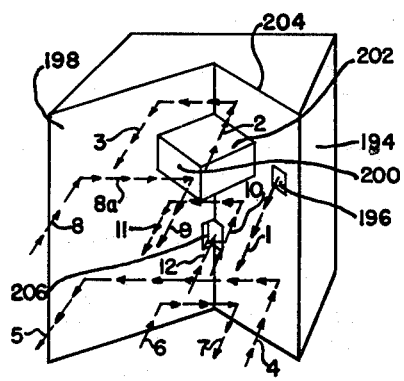
Fig. 13 is an isometric view of one of the corner reflectors employed in a delay line having twelve major paths.

If the recess 184 of Fig. 11 is omitted, energy travelling along path 8 will be reflected from the surface of reflector 180 toward recess 182 and would strike this recess unless some intervening energy reflecting surface is encountered. Fig. 13 illustrates the reflector 194 used to form the pattern shown in Fig. 12. Recess 196 in Fig. 13 occupies the same relative position as does recess 182 of Fig. 11. The recess corresponding to recess 184 of Fig. 11 is omitted from face 198 of Fig. 13. Paths 1 through 8 of Figs. 12 and 13 correspond exactly to paths 1 through 8 of Figs. 10 and 11. When path No. 8 strikes face 198 of reflector 194, it is reflected along path 8a. Energy travelling along path 8a would strike recess 196 unless intercepted by an auxiliary reflecting surface. Such an auxiliary reflecting surface is provided by face 200 of block 202 secured to reflector 194. Face 200 is parallel to face 204 of reflector 194 and is spaced from face 204 by an amount such that energy travelling along path 8a strikes face 200 at a point lying on the central plane of reflector 194. The energy travelling along path 8a is thus reflected along path 9 shown in Fig. 13 and diagrammatically illustrated by circle No. 9 of Fig. 12. Energy travelling along path 9 will be reflected into paths 10, 11, and 12, respectively, in the manner described in connection with the description of Fig. 8.

A recess 206 is formed in reflector 194 to receive the receiving crystal at the point that path 12 intersects the surface of this reflector. In the case of a delay line employing 12 paths, recess 206 is located on the line of intersection of faces 198 and 204.

It should be obvious that a single delay line capable of giving two time delays, one approximately twice the length of the other, may be constructed. For example, a delay line having eight major transmission paths could be constructed in the manner described in connection with the description of Figs. 10 and 11. A second transmitting crystal may be located at a position corresponding to circle No. 9 of Fig. 12 and a second receiving crystal may be located at a position corresponding to the position of circle No. 12 of Fig. 12. Signals could be applied to either transmitting crystal independently of the other and signals introduced by the transmitting crystal located at the position corresponding to circle No. 1 of Fig. 12 could be received by the receiving crystal located at the position corresponding to circle No. 8 of Fig. 12; while signals introduced by the transmitting crystal located at a position corresponding to circle No. 9 of Fig. 12 would be received by the receiving crystal located at a position corresponding to circle No. 12 of Fig. 12. The reflector for accomplishing this result has not been illustrated in the drawing but it is believed that the configuration of such a reflector should be obvious from the foregoing description.

Figure 14:
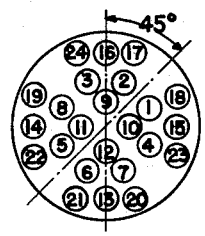
Fig. 14 is a diagram showing the disposition of paths in a delay line having twenty-four major paths.

Fig. 14 illustrates a delay line having 24 major transmission paths. Paths 1 through 12 correspond in position to paths 1 through 12 of Fig. 12.

Figures 15, 16:
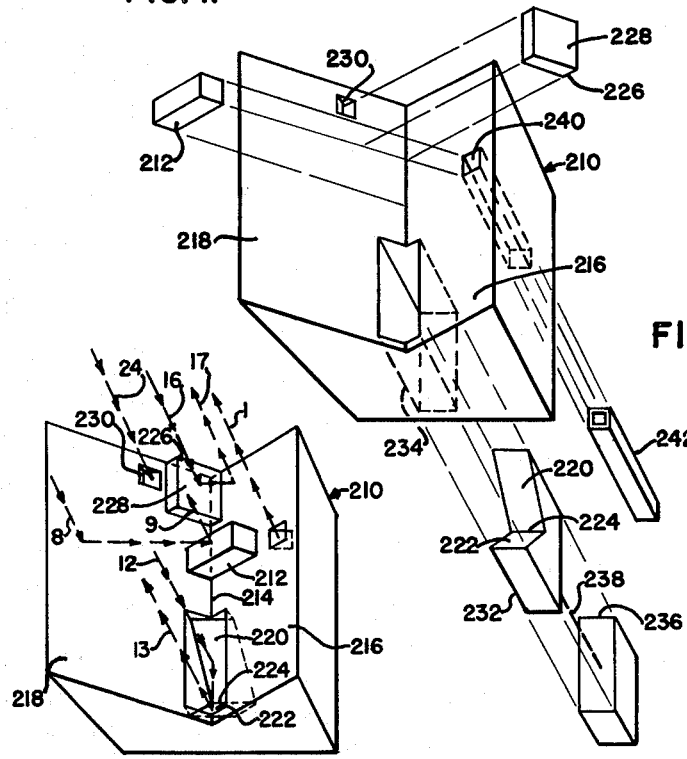
Fig. 15 is an isometric view of one of the reflectors employed in a delay line having twenty-four major paths.
Fig. 16 is an exploded view of the reflector shown in Fig. 15.

Figs. 15 and 16 illustrate the reflector 210 employed to obtain the pattern shown in Fig. 14. Block 212 of Fig. 15 corresponds to block 202 of Fig. 13. The recess 206 of Fig. 13 is omitted from the reflector shown in Fig. 15. In place of recess 206, an auxiliary corner reflector is formed at the line of intersection 214 of faces 216 and 218. This auxiliary corner reflector is defined by faces 220 and 222 which intersect in a line 224. Line of intersection 224 is perpendicular to line of intersection 214 but lies a slight distance behind line 214. Energy travelling along path 12 strikes face 220, is reflected to strike face 222 and is again reflected along path 13 shown in Fig. 15 and diagrammatically illustrated by circle No. 13 in Fig. 14.

Energy travelling along path 13 is reflected into paths 14, 15 and 16 in a manner similar to the reflections that occur in a delay line of the type diagrammatically illustrated by Fig. 8. If desired, a crystal recess (not shown) could be located at the position corresponding to circle No. 16 in Fig. 14. If this was done, a delay line would be one having 16 major transmission patterns. However, if it is desired to have 24 transmission paths as originally suggested, means must be provided for deflecting the energy travelling along path 16 into path 17. It will be noted that if such auxiliary means is not provided energy travelling along path 16 would strike reflector 210 at a point on the line of intersection 214. Energy thus striking reflector 210 would be reflected back along the path of incidence. In the reflector illustrated in Figs. 15 and 16, energy is directed from path 16 to 17 by means of a block 226 having a face 228 disposed parallel to face 218. Face 228 is spaced from face 218 by a distance sufficient to cause energy travelling along path 16 to strike face 216 of reflector 210 at a position corresponding to circle No. 17 of Fig. 14. Energy travelling along path 17 will be reflected into paths 18 through 24 in a manner similar to that described in connection with Figs. 10 and 11. A crystal recess 230 is provided in face 218 at a position corresponding to the position of circle No. 24 of Fig. 14.

The exploded view of Fig. 16 illustrates one convenient method of constructing a reflector shown in Fig. 15. Blocks 212 and 226 may be machined to the desired shape and soldered, welded, or otherwise mechanically secured to the appropriate position on reflector 210. The auxiliary corner reflector formed by faces 220 and 222 may be formed in a block 232. Block 232 may be fitted into rectangular recess 234 formed in reflector 210. If desired, block 232 may be welded within recess 234. However, if the delay line is to provide some means for adjusting the delay time, it would be undesirable to move reflector 210 in the manner described in connection with Fig. 1 for the reason that any change in position of reflector 210 will increase the length of each of the 24 paths employed in the delay line now being described. Therefore, relatively small changes in position of reflector 210 would cause relatively great changes in the delay time introduced by this delay line. If block 232 is made slidable in recess 234 the position of block 232 may be made adjustable. Changing the position of block 232 will change the length of only two of the major transmission paths employed in this delay line. Therefore, small changes in the position of block 232 will result in correspondingly small changes in delay time introduced by this delay line. The means for adjusting the position of block 232 may be any positioning means well known in the art. Such means is diagrammatically illustrated by block 236 of Fig. 16. Dash line 238 of Fig. 16 schematically represents the mechanical coupling between positioning device 236 and block 232.

A second method of forming the corner reflectors used in delay lines of the type herein disclosed is to make a mold of the proper shape and cast the reflectors of some suitable material. Casting resin is a satisfactory material for this purpose.

Recess 240 of Fig. 16 which receives the transmitting crystal of transducer may extend completely through reflector 210. Crystal transducer assembly 242 of Fig. 16 may be secured in recess 240 in any desired manner.

Figure 17:
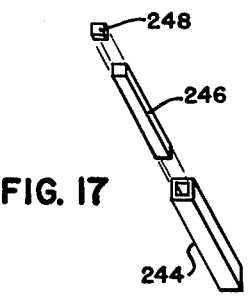
Fig. 17 is an exploded view of one of the elements shown in Fig. 16.

Fig. 17 is an exploded view of one form of crystal assembly 242 shown in Fig. 16. As shown in Fig. 17, crystal assembly 242 comprises a hollow tube 244 of dielectric material within which is disposed a core 246 of conductive material. Transmitting crystal 248 is secured to the end of core 246. Means (not shown) may be provided for making the electrical connection to core 246 and to the face of crystal 248 opposite core 246. Recess 230 may be formed in the same manner as recess 240 or an alternative crystal mounting arrangement, many of which are known to those skilled in the art, may be substituted for the arrangement illustrated herein. An alternative method of constructing the reflector 210 shown in Fig. 15 would be to build up a small corner reflector at the intersection of faces 216 and 218. If this is done, care should be taken that the reflecting surface is not built up to such a height that it will interfere with the other paths striking faces 216 and 218. To avoid confusion only the paths requiring special treatment have been illustrated in Fig. 15. While the delay line just described employs 24 major transmission paths, it should be obvious that any number of transmission paths from 1 to 24 may be obtained by mounting the receiving crystal at positions corresponding to numbered circles 1 through 24, respectively of Fig. 14. To obtain an odd number of paths, the receiving crystal should be mounted opposite the reflector carrying the crystal; while an even number of paths, the receiving crystal should be mounted in the same reflector that carries the transmitting crystal. It should be noted in connection with the delay line employing 24 paths that only the reflector carrying the transmitting and receiving signals require special treatment. The second reflector employed in the delay line having 24 major transmission paths is identical to a reflector 44 of Fig. 3.

While it has been described what is at present considered the preferred embodiment of the invention, it will be obvious to those skilled in the art that various modifications and changes may be made therein without departing from the spirit and scope of the appended claims.

The invention described herein may be manufactured and used by or for the Government of the United States of America for governmental purposes without the payment of royalty thereon or therefor.

What is claimed is:

1. An ultrasonic delay line comprising a first and second 90° diplanar corner reflector disposed in spaced relationship to each other and each disposed with the vertex line thereof perpendicular to a common axis, an acoustical energy transmission medium disposed intermediate said corner reflectors and in contact therewith, first and second electro-acoustical transducers disposed in separate planes of said first reflector, said first electro-acoustical transducer acting to convert an electrical signal to acoustical energy directed in a beam at the second of said reflectors, said beam being directed substantially parallel to said common axis and said second electro-acoustical transducer acting to receive acoustical energy reflector from said second acting reflector after multiple reflections from each reflector in paths parallel to said common axis and to convert said acoustical energy into an electrical signal.

2. A delay line as in claim 1 wherein said corner reflectors are so disposed that a plane including the vertex line of said first reflector and said common axis makes an angle greater than zero with a plane including the vertex line of said second reflector and said common axis whereby acoustical energy from said first transducer is received by said second transducer after being multiply reflected by said two corner reflectors.

3. A delay line as in claim 1, said delay line further comprising at least one auxiliary reflecting surface disposed in a spaced parallel relationship with one plane of one of said reflectors.

4. A delay line as in claim 1 wherein said corner reflectors are so disposed that a plane including the vertex line of said first reflector and said common axis makes an angle greater than zero with a plane including the vertex line of said second reflector and said common axis whereby acoustical energy from said first transducer is received by said second transducer after being multiply reflected by said two corner reflectors, said delay line further comprising an auxiliary reflecting surface disposed in a spaced parallel relationship to one plane of one of said reflectors whereby the number of said multiple reflections is increased.

5. A delay line as in claim 1, said delay line further comprising at least one auxiliary reflecting surface disposed in a spaced parallel relationship to one face of said reflector and at least one auxiliary corner reflector disposed adjacent one of said corner reflectors, the vertex line of said auxiliary corner reflectors being disposed at substantially a right angle to the vertex line of said last-mentioned corner reflector.

6. A delay line as in claim 1 wherein said corner reflectors are so disposed that a plane including the vertex line of first reflector and said common axis makes an angle greater than zero with a plane including the vertex line of said second reflector and said common axis and wherein said first and second transducers are disposed adjacent said first corner reflector.

7. A delay line as in claim 1 wherein said corner reflectors are so disposed that a plane including the vertex line of first reflector and said common axis makes an angle greater than zero with a plane including the vertex line of said second reflector and said common axis and wherein said first and second transducers are disposed in recesses formed in said first corner reflector.

8. A delay line as in claim 1, said delay line further comprising means for adjusting the delay time of said delay line.

9. An ultrasonic delay line comprising first and second 90° diplanar corner reflectors disposed in spaced relationship to each other and each disposed with the vertex line thereof perpendicular to a common axis, an acoustical energy transmission medium disposed intermediate said corner reflectors and in contact therewith, first and second electro-acoustical transducers disposed in separate planes of said first reflector, said first electro-acoustical transducer acting to convert an electrical signal to acoustical energy directed in a beam at the second of said corner reflectors, said beam being directed substantially parallel to said common axis, said second electro-acoustical transducer acting to receive acoustical energy reflected from said second reflector after multiple reflections from each reflector in paths parallel to said common axis and to convert said acoustical energy into an electrical signal, a first auxiliary reflector disposed in a spaced parallel relationship to one plane of said one of said corner reflectors, a second auxiliary reflector disposed in a spaced parallel relationship to one plane of one of said corner reflectors and an auxiliary corner reflector disposed adjacent one of said corner reflectors.

10. A delay line as in claim 9 wherein said first and second transducers, said first and second auxiliary reflectors and said auxiliary corner reflector are disposed adjacent said first corner reflector.

11. A delay line as in claim 9 wherein said first corner reflector is formed with a first and second recess to receive said first and second transducers respectively, wherein said first auxiliary reflector is disposed in spaced relationship with one plane of said first reflector and said second auxiliary reflector is disposed in a spaced parallel relationship to the other plane of said first reflector, and wherein said auxiliary corner reflector is disposed with the vertex line of said auxiliary corner reflector perpendicular to the vertex line of said first corner reflector.

12. A delay line as claimed in claim 9, said delay line further comprising means for varying the length of the acoustical path from said first transducer to said second transducer.

13. An ultrasonic delay line comprising a hollow cylindrical housing, a first corner reflector disposed within said housing with the vertex line thereof perpendicular to the axis of said housing, said first corner reflector having a first and second recess formed therein, first and second electro-acoustical transducers adapted to be positioned within said first and second recesses in said first corner reflector, a second corner reflector disposed within said housing and in spaced relationship with said first corner reflector, a transmission medium enclosed within said housing and between said two corner reflectors, and a path defining means located intermediate said two corner reflectors and in axial alignment with said housing.

14. A delay line as in claim 13, said delay line further comprising means permitting expansion of said transmission medium.

15. A delay line as in claim 13, said delay line further comprising means disposed coaxially with said housing permitting expansion of said transmission medium.

16. A delay line as in claim 13, wherein said path defining means is formed with a central opening, said delay line further comprising a sealed resilient structure within said opening in said path defining means, said resilient structure containing a gas under pressure.

17. An ultrasonic delay line comprising first and second diplanar corner reflectors disposed in spaced relationship with each other, said reflectors being disposed so that a plane bisecting the angle of said first reflector intersects a plane bisecting the angle of said second reflector at an angle other than zero, an acoustical energy transmission medium disposed intermediate said corner reflectors, and means for directing a beam of acoustical energy at one of said reflectors in a direction parallel to the line of intersection of said bisecting planes, said line of intersection intersecting the vertex line of each of said corner reflectors.

18. An ultrasonic delay line comprising first and second diplanar corner reflectors disposed in spaced relationship with each other, said reflectors being disposed so that a plane bisecting the angle of said first reflector intersects a plane bisecting the angle of said second reflector at an angle other than zero, an acoustical energy transmission medium disposed intermediate said corner reflectors, and means for directing a beam of acoustical energy at one of said reflectors along a path parallel to and spaced from the line of intersection of said bisecting planes, said line of intersection intersecting the vertex line of each of said corner reflectors.

19. Apparatus as in claim 18 and means for receiving said energy after at least one reflection from each of said reflectors.

20. An ultrasonic delay line comprising first and second 90° diplanar corner reflectors disposed in spaced relationship to each other, each of said reflectors being disposed with the vertex line thereof perpendicular to and intersecting a common axis and in a nonparallel relationship to the vertex line of the other said reflector, an acoustical energy transmission medium disposed intermediate said corner reflectors and in contact therewith, means for directing acoustical energy at one of said reflectors along a path parallel to said common axis whereby reflected paths of said energy lie between said two corner reflectors and means for receiving energy reflected from one of said reflectors.

21. An ultrasonic delay line comprising first and second 90° diplanar corner reflectors disposed in spaced relationship to each other, each of said reflectors being disposed with the vertex line thereof perpendicular to and intersecting a common axis and in a nonparallel relationship to the vertex line of the other said reflector, an acoustical energy transmission medium disposed intermediate said corner reflectors and in contact therewith, means disposed adjacent one of said reflectors for directing energy at one of said reflectors along a path parallel to and spaced from said common axis whereby reflected paths of said energy lie between said two corner reflectors and means disposed adjacent one of said reflectors for receiving energy traveling along one of said reflected paths.

22. An ultransonic delay line comprising, a first and a second diplanar corner reflector disposed in spaced relationship to each other and each disposed with the vertex line thereof perpendicular to a common axis, an acoustical energy transmission medium disposed intermediate said corner reflectors and in contact therewith, a first transducer adapted to convert an applied signal to acoustical energy directed in a beam at one of said reflectors, said beam being directed substantially parallel to said common axis, said reflectors being so disposed that said beam upon reflection from said reflectors is directed in multiple paths substantially parallel to said common axis.

23. An ultrasonic delay line comprising, a first and a second diplanar corner reflector disposed in spaced relationship to each other, an acoustical energy transmission medium disposed intermediate said corner reflectors and in contact therewith, a first transducer adapted to convert an applied signal to acoustical energy directed in a beam at one of said reflectors, said reflectors being so disposed with respect to said beam of energy that said beam upon reflection from either of said reflectors is directed at the other of said reflectors in multiple paths substantially parallel to the initial direction of said beam, and a second transducer adapted to receive acoustical energy reflected from one of said reflectors and to convert said acoustical energy into an output signal.

24. An ultrasonic delay line comprising, a first and a second diplanar corner reflector disposed in spaced relationship to each other, the vertex angle of each of said reflectors being not greater than 90°, an acoustical energy transmission medium disposed intermediate said corner reflectors and in contact therewith, a first transducer adapted to convert an applied signal to acoustical energy directed in a beam at one of said reflectors, said reflectors being so disposed with respect to said beam that said beam upon reflection from either of said reflectors is directed at the other of said reflectors in multiple paths substantially parallel to the initial direction of said beam, and a second acoustical reflector adapted to receive acoustical energy reflected from one of said reflectors and to convert said acoustical energy into an output signal.

25. An ultrasonic delay line comprising, a first and a second diplanar corner reflector disposed in spaced relationship to each other and each disposed with the vertex line thereof perpendicular to a common axis, said common axis bisecting the vertex angle of each of said reflectors, said corner reflectors being so disposed that a plane including the vertex line of said first reflector and said common axis makes an angle greater than zero with a plane including the vertex line of said second reflector and said common axis, a first transducer adapted to convert an applied signal to acoustical energy directed in a beam at one of said reflectors, said beam being directed substantially parallel to said common axis, and a second transducer adapted to receive acoustical energy reflected from one of said reflectors and to convert said acoustical energy into an output signal.

26. A delay line as in claim 25, said delay line comprising at least one auxiliary reflecting surface disposed in spaced parallel relationship with one plane of one of said reflectors.

27. A delay line as in claim 25, said delay line further comprising at least one auxiliary reflecting surface disposed in a spaced parallel relationship to one face of one of said corner reflectors and an auxiliary corner reflector disposed adjacent one of said corner reflectors, the vertex line of said auxiliary corner reflector being disposed substantially at right angles to the vertex line of said last-mentioned corner reflector.

28. An ultrasonic delay line comprising a hollow cylindrical housing, a first corner reflector disposed within said housing with the vertex line thereof perpendicular to the axis of said housing, a second corner reflector disposed within said housing with the vertex line thereof perpendicular to the axis of said housing, a transmission medium enclosed within said housing and between said corner reflectors, a cylindrical path defining means positioned intermediate said corner reflectors with the axis thereof coincident with the axis of said cylindrical housing, said path defining member being formed with a plurality of bores parallel to and spaced from the axis thereof, a first transducer adapted to convert an applied signal to acoustical energy directed in a beam down one of said bores of said path defining means, said corner reflectors being so positioned that said beam upon reflection from each of said corner reflectors is directed down a selected one of said bores and a second transducer adapted to receive acoustical energy reflected from one of said reflectors and to convert said received acoustical energy into an output signal.

29. A delay line as in claim 28 wherein said path defining means is formed with a central opening, said delay line further comprising a sealed resilient structure disposed within said central opening, said resilient structure containing a gas under pressure.

References Cited in the file of this patent

UNITED STATES PATENTS

| | | |
|---|---|---|
| 1,687,714 | Cullum | Oct. 16, 1928 |
| 1,751,409 | Jackson | Mar. 18, 1930 |
| 1,832,763 | Campbell | Nov. 17, 1931 |
| 2,263,902 | Percival | Nov. 25, 1941 |
| 2,505,364 | McSkimin | Apr. 25, 1950 |
| 2,558,012 | Star | June 26, 1951 |